March 19, 1968   G. F. LEWIS   3,373,497
HEIGHT GAGES

Filed Sept. 17, 1965   2 Sheets-Sheet 1

INVENTOR.
GERALD F. LEWIS
BY
Everett E. Wright
ATTORNEY

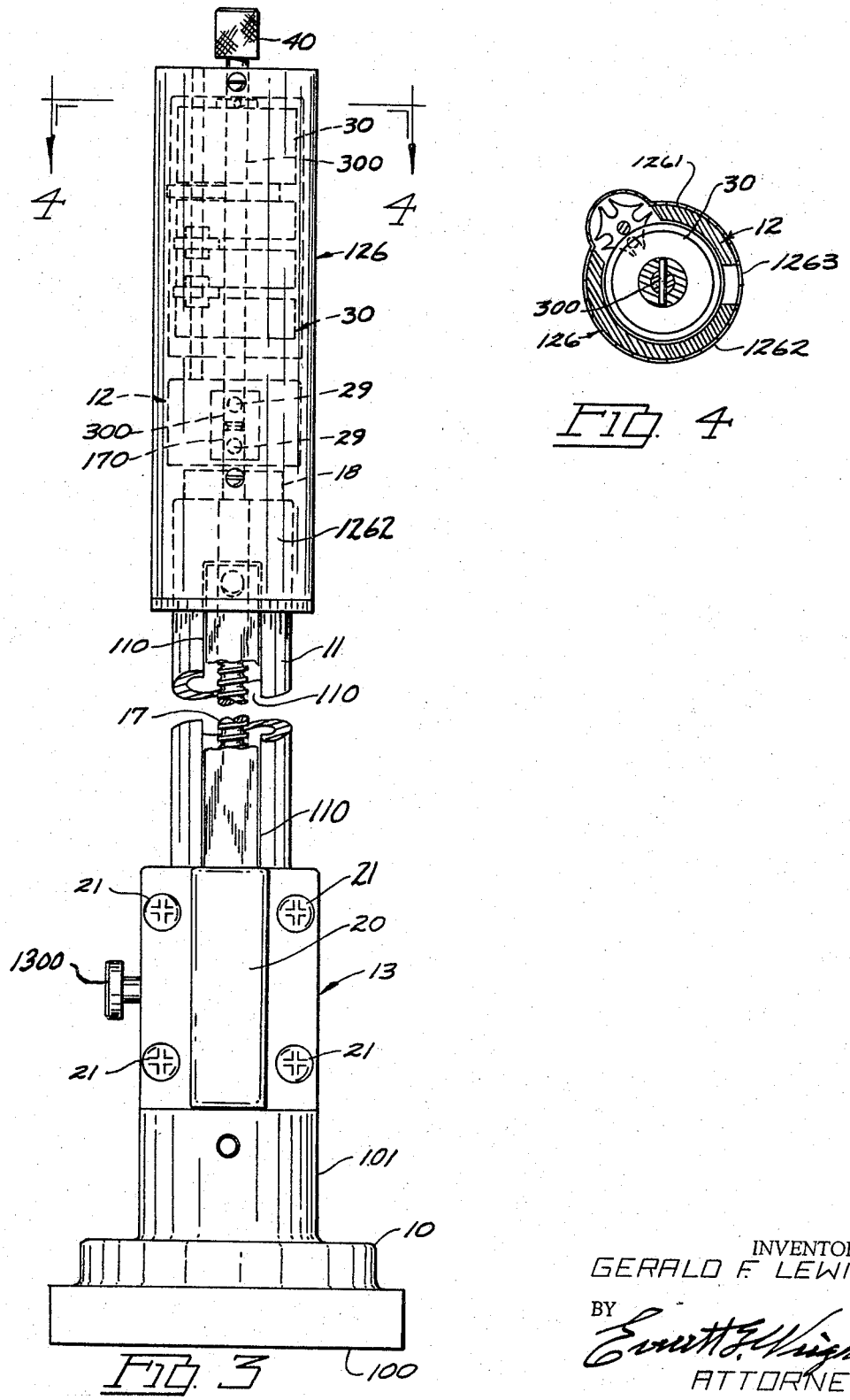

United States Patent Office 3,373,497
Patented Mar. 19, 1968

3,373,497
HEIGHT GAGES
Gerald F. Lewis, 1850 Columbia,
Berkley, Mich. 48072
Filed Sept. 17, 1965, Ser. No. 488,038
6 Claims. (Cl. 33—170)

ABSTRACT OF THE DISCLOSURE

A height gage in which a hollow stanchion fixed to the base houses a longitudinal screw journaled in ball bearings and rotatably drivable by manually sliding a ball nut thereon axially of the stanchion. The ball nut is connected to and moves with a handle on the gage arm. The screw is coupled to a fine adjustment knob and to a gage height counter having its last digit wheel peripherally graduated. The longitudinal guide slot in the stanchion, through which the handle connects with the ball nut, is closed by two tapes reeled within the handle.

---

This invention relates to improvements in height gages of the self-indicating direct reading type.

The primary object of the invention is to provide a readily manipulable and easily read height gage including means automatically indicating and directly reading digitally in hundredths and by scale in thousandths the precise position of the gage arm or scribe above a given surface or selected point.

Another object of the invention is to provide an easily and readily manipulable height gage employing ball-nut screw driven height indicating means directly indicating the position to which the gage arm is moved in thousandths without the use of vernier scales.

Another object of the invention is to provide an indicator height gage wherein vertical and precise movement of the gage arm may be accomplished smoothly and with a minimum of effort, the said gage arm being readily lockable in the position to which it is moved.

A further object of the invention is to provide a height gage including a substantial base and a gage stanchion extending vertically therefrom mounting thereon direct reading height indicator means driven by a ball-nut screw drive with the screw thereof rotatably mounted within said gage stanchion, a gage arm assembly having a gage arm extending therefrom telescopingly mounted on said stanchion, said gage arm assembly being fixed to and movable with the ball-nut of the said ball-nut screw drive, and locking means removably fixing said gage arm assembly to any vertical position to which it may be moved.

Other objects of the invention will become apparent by reference to the following detailed description taken in connection with the accompanying drawings, in which:

FIG. 3 is a rear elevational view taken on the line 3—3 of FIG. 2 with a portion thereof broken away.

FIG. 4 is a horizontal sectional view taken on the line 4—4 of FIG. 3.

Figures 1, 2:
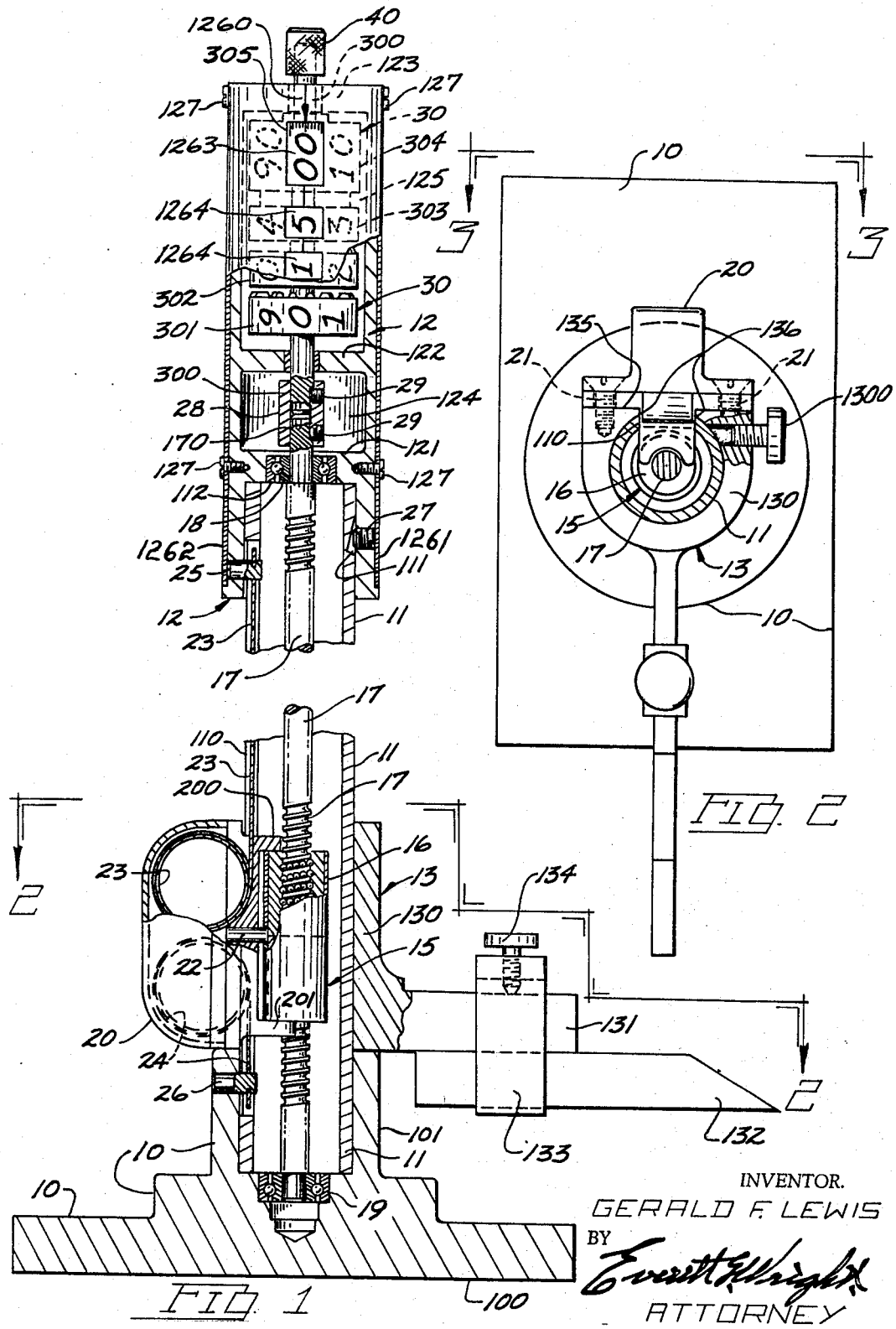
FIG. 1 is a longitudinal vertical sectional view of a height gage embodying the invention, portions thereof being shown in elevation.
FIG. 2 is a horizontal sectional view taken on the line 2—2 of FIG. 1.

Referring now to the drawings wherein like reference characters refer to like and corresponding parts throughout the several views, the particular embodiment of a height gage of the invention shown therein consists of a base 10, a hollow stanchion 11 centrally mounted on said base 10 in an integral sleeve 101 thereof preferably extending upwardly therefrom, an indicator housing 12 having indicator mechanism 30 therein mounted on said stanchion, a gage arm assembly 13 including a sleeve 130 telescopingly mounted on and for movement along the said stanchion 11, and a pointer arm 131 extending from said sleeve having a suitable pointer or scribe 132 adjustably fixed thereto by such means as a hollow clamp 133 and a set screw 134.

A ball-nut screw assembly 15 consisting of a ball-nut 16 mounted on a screw 17 is disposed centrally within the hollow stanchion 11. The said screw 17 is preferably rotatably mounted on suitable upper and lower ball bearings 18 and 19 which are fixed centrally in the lower web 121 of the indicator housing 12 and in the base 10 respectively. A height indicator mechanism 30, preferably directly reading, for example, numerically in inches, tenths and hundredths, and by scale in thousandths, is suitably mounted in said indicator housing 12, and has its main shaft 300 operatively connected to the screw 17 of the ball-nut screw assembly 15.

The said sleeve 130 of the gage arm assembly 13 is vertically flanged at 135 and vertically slotted at 136 at the rear thereof to receive a hand grip element 20 which is secured thereto by suitable screws 21. The hollow stanchion 11 is slotted vertically at 110 to slidably accommodate upper and lower arms 200 and 201 respectively extending from the hand grip element 20 through the said vertical slot 110 in the hollow stanchion 11. The said arms 200 and 201 of the hand grip element 20 are fixed by suitable means to the ball-nut 16 of the ball-nut screw assembly 15 so that manual vertical movement of the hand grip element 20 will carry the ball-nut 16 with it. Thus, manual movement of the hand grip element 20 of the gage arm assembly 13 rotates the screw 17 of the ball-nut screw assembly 15 which in turn rotates the height indicator mechanism 30 carried in the indicator housing 12. A pin 22 carried by the hand grip element 20 extends into the ball-nut 16 and positively prevents its rotation in respect thereto at all times.

Although not shown in the drawings, it is obvious that the screw 17 of the ball-nut screw assembly 15 may be rotated in selected opposite directions by a suitable electric drive means, thus providing a power driven height gage when and as required. In such a power driven height gage, the maintaining of auxiliary hand operation of the height gage such as the hand operation herein described would be desirable for small increments of movement of the gage arm assembly 13.

In the hand grip 20 is a suitable recess 202 which accommodates a pair of oppositely coiled Neg'ator springs 23 and 24 of the width slightly narrower than the vertical slot 110 in the hollow stanchion 11. The distal ends of the Neg'ator springs 23 and 24 are anchored by suitable pins 25 and 26 to the hollow stanchion 11 respectively above and below the vertical slot 110 therein which accommodates the hand grip arms 200 and 201. Thus, the Neg'ator springs 23 and 24 constantly maintain the vertical slot 110 in the stanchion 11 substantially closed as the pointer arm assembly 13 is moved upwardly or downwardly along the stanchion 11.

The indicator housing 12 is preferably tubular in shape, is telescoped vertically over the upper end of the hollow stanchion 11, and is secured thereto by a set screw 27 threaded through the lower portion of the wall 120 of the said indicator housing 12 at an angular notch 111 formed in the said stanchion 11. The lower web 121 of the said indicator housing 12 is preferably seated firmly on the upper end 112 of the said stanchion 11. As before stated, the upper ball bearing 18 mounting the screw 17 of the ball-nut screw assembly 15 is fixed centrally in the said lower web 121 of the indicator housing 12. The upper end 170 of the said screw 17 extends through the said ball bearing 18 as best shown in FIG. 1. The said indicator housing 12 is preferably provided with a centrally apertured intermediate web 122 and an upper cap 123 forming a shaft coupling chamber 124 and an indicator chamber 125 within the said indicator housing 12.

The height indicator mechanism 30 may be a more or less standard counter having a main shaft 300 and four rotatable numerical indicator wheels 301, 302, 303 and 304, and a calibrated indicator scale 305 etched or printed at the upper periphery of the rotatable numerical indicator wheel 304. The height indicator mechanism 30 has the lower end of its main shaft 300 coupled by a suitable coupler 28 and set screws 29 to the upper end 170 of the screw 17 of the ball-nut screw assembly 13, and is driven thereby in opposite directions responsive to the raising and lowering of the ball-nut 16 of the ball-nut screw assembly 15 by manually raising and lowering the hand grip element 20 fixed thereto. Since the gage arm assembly 13 and the pointer or scribe 132 thereof move with the ball-nut 16 of the ball-nut screw drive 15, the extent of movement of the said gage arm assembly 13 from one position of the pointer or scribe 132 to another is registered on the height indicator mechanism 30.

The indicator housing 12 preferably has a suitable cover element 126 thereover secured thereto by suitable studs 127. The said indicator housing cover element 126 may be formed in two halves 1261 and 1262 suitably apertured to provide windows at 1263 and 1264 to permit the digital indicator wheels 301, 302, 303 and 304 and the calibrated indicator scale 305 of the indicator mechanism 30 to be easily and accurately read in a single reading. The parting line of the two halves 1261 and 1262 of the indicator housing cover element 126 is preferably marked by a fixed indicator arrow 1260 to permit the calibrated indicator scale 305 to be easily and accurately read, and, although not shown, the windows, through which the said indicator wheels and scale may be read, are preferably covered with a clear plastic or glazed to prevent dust or dirt from accumulating in the indicator mechanism 30.

The indicator wheels 301 and 302 of the particular embodiment of the height gage shown in the drawings register the number of inches the pointer or scribe 132 is positioned above the bottom 100 of the base 10 thereof. Indicator wheel 303 registers the number of tenths of inches to which the pointer or scribe 132 is moved. Indicator wheel 304 registers the number of hundredths of inches in increments of ten thousandths to which the pointer or scribe 132 is moved. The calibrated scale 305 on the indicator wheel 304 registering with the fixed indicator arrow 1260 on the indicator housing registers the number of thousandths of inches to which the pointer or scribe 132 is moved.

In FIG. 1, the pointer or scribe 132 is shown at its lowest position; that is, at 1½ inches above the bottom 100 of the base 10 of the height gage element illustrating the invention, and the indicator mechanism 30 registers 01.500. Assuming the pointer or scribe was to be moved to a point 4⅝ inches above the bottom 100 of the base 10 of the height gage, then, 01.500 would be subtracted from 04.625 requiring the pointer or scribe to be raised manually until the indicator mechanism read 03.125. Obviously, if lower readings than 01.500 were required, a suitable goosenecked pointer or scribe would be substituted for the pointer or scribe 132 illustrated in FIG. 1.

To obtain readily fine adjustment of the pointer or scribe 132 with extreme accuracy, the main shaft 300 of the indicator mechanism 30 extending above the top of the indicator housing 12 is provided with a preferably knurled cap 40 which may be manually turned to move the gage arm assembly 13 carrying the pointed or scribe 132 minutely either upwardly or downwardly to arrive at the precise position desired above the bottom 100 of the base 10 to a height gage of the invention as determined by the reading of the indicator mechanism 30. A suitable lock screw 1300 disposed in the sleeve 130 of the gage arm assembly for engagement with the stanchion 11 is employed to lock the gage arm assembly 13 in any position it may be elevated on the stanchion 11 to move the pointer or scribe 132 to the desired elevation above the bottom 100 of the base 10 of a height gage of the invention.

Although but a single embodiment of the invention and a single example of its operation has been disclosed and described in detail herein, it is obvious that many changes may be made in the size, shape, arrangement and detail of the several elements of the invention, all without departing from the spirit and scope thereof as defined by the appended claims.

I claim:
1. A height gage comprising
   a base element and a hollow stanchion fixed thereto and extending upwardly therefrom,
   a direct reading height indicator means mounted on said stanchion,
   said stanchion having a vertical slot therein between said base and said height indicator means,
   a ball-nut screw means within said hollow stanchion having its ball-nut threaded on its screw and its screw rotatably mounted in said stanchion and operatively connected to said height indicator means, and
   a gage arm assembly including a pointer extending therefrom slidably mounted in non-turnable relationship on said stanchion fixedly connected to said ball-nut through said vertical slot therein,
      said gage arm assembly being manually movable upwardly and downwardly with respect to said stanchion whereby said height indicator means is driven by said ball-nut screw means and provides a reading indicating the height to which said pointer is moved with respect to the bottom of the base of the height gage.

2. A height gage as claimed in claim 1 wherein the height indicator means is provided with a plurality of direct digitally reading dials showing the height to which the pointer is moved above the bottom of said base in a unit of measurement, and in tenths and hundredths of said unit of measurement.

3. A height gage as claimed in claim 1 wherein
   the height indicator means is provided with a plurality of direct digitally reading dials showing the height in a unit of measurement to which the pointer is moved with respect to the bottom of said base and in tenths and hundredths of said measurement unit, and
   a scale on the hundredth numerically reading dial readable in thousandths against a fixed point on said height gage indicator means whereby said height gage also shows the said height to which the pointer is moved in thousandths of said unit of measurement.

4. A height gage comprising
   a base element and a hollow stanchion fixed thereto and extending upwardly therefrom,
   a direct reading height indicator means mounted on said stanchion,
   said stanchion having a vertical slot therein between said base and said height indicator means,
   ball-nut screw means within said hollow stanchion having its ball-nut threaded on its screw and its screw rotatably mounted in said stanchion and operatively connected to said height indicator means, and
   a gage arm assembly slidably mounted on said stanchion including
      a pointer extending laterally from said gage arm assembly, and
      a hand grip fixed on said gage arm assembly including means extending through said slot in said stanchion engaging said ball-nut and holding it against rotation whereby manual vertical movement of said hand grip moves said gage arm assembly to raise and lower said pointer simultaneously with causing said ball-nut to rotate said screw thereby operating said height indicator means and providing a reading thereon showing the height to which said pointer is moved above the bottom of said base.

5. A height gage as claimed in claim 1 wherein the height indicator means is provided with a plurality of direct digitally reading dials showing the height in inches, tenths and hundredths of an inch to which the pointer has been moved above the bottom of said base.

6. A height gage as claimed in claim 1 wherein the height indicator means is provided with a plurality of direct digitally reading dials showing the height in inches, tenths and hundredths of an inch to which the pointer has been moved above the bottom of said base, and a scale on the hundredth of an inch digitally reading dial readable in thousandths against a fixed point on said height gage indicator means whereby said height gage shows the height in inches, tenths, hundredths and thousandths of an inch of the pointer above the bottom of said base.

References Cited
UNITED STATES PATENTS

| | | | |
|---|---|---|---|
| 1,570,481 | 1/1926 | Grain et al. | 73—320 X |
| 2,471,050 | 5/1949 | Turrettini | 33—138 X |
| 2,535,881 | 12/1950 | Vangor | 33—170 |
| 3,016,192 | 1/1962 | Cook et al. | 73—320 X |
| 3,170,336 | 2/1965 | Bohnhoff | 74—424.8 |
| 3,289,310 | 12/1966 | Stone | 33—170 |

ROBERT B. HULL, *Primary Examiner.*